(12) United States Patent
Lee

(10) Patent No.: US 7,769,515 B2
(45) Date of Patent: Aug. 3, 2010

(54) METHOD FOR CONTROLLING SHIFT DURING SHIFT OF AUTOMATIC TRANSMISSION

(75) Inventor: Jin Soo Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 660 days.

(21) Appl. No.: 11/821,026

(22) Filed: Jun. 21, 2007

(65) Prior Publication Data

US 2008/0139364 A1 Jun. 12, 2008

(30) Foreign Application Priority Data

Dec. 9, 2006 (KR) ............ 10-2006-0125186

(51) Int. Cl.
*F16H 31/00* (2006.01)
*G06F 19/00* (2006.01)
(52) U.S. Cl. ............ 701/51; 701/64; 477/127
(58) Field of Classification Search ............ 701/51, 701/55, 56, 64, 58; 477/127, 110, 130–140, 477/143, 148; 475/132, 116
See application file for complete search history.

(56) References Cited

U.S. PATENT DOCUMENTS 6,042,506 A * 3/2000 Kozaki et al. ............ 477/148
6,625,532 B2 * 9/2003 Takatori et al. ............ 701/51
6,962,549 B2 * 11/2005 Dreibholz et al. ............ 475/284
7,384,375 B2 * 6/2008 Yamada et al. ............ 477/143

* cited by examiner

*Primary Examiner*—Tan Q Nguyen
(74) *Attorney, Agent, or Firm*—Morgan, Lewis & Bockius LLP

(57) ABSTRACT

A method for controlling a shift during a shift of an automatic transmission controls to complete an N to N-2 shift and an N-2 to N-3 shift simultaneously such that the shift during a shift is smoothly performed when the N-2 to N-3 shift where one frictional element is released is required to be performed during the N to N-2 shift where another frictional element is released and the other frictional element is engaged. A method for controlling a shift during a shift of an automatic transmission may overlap an N to N-2 shift where a first frictional element is engaged and a second frictional element is released with an N-2 to N-3 shift where a third frictional element is released, wherein a release of the second frictional element begins after an engagement of the first frictional element begins, and a release of the third frictional element begins after an N-2 to N-3 shift signal is detected, wherein the engagement of the first frictional element and the release of the second and third frictional elements are simultaneously completed.

12 Claims, 5 Drawing Sheets

|   |    | C1 | C2 | C3 | B1 | B2 | B3 | GEAR Ratio |
|---|----|----|----|----|----|----|----|-----------|
| D | D1 |    |    |    | ○  | ●  |    | 3.827 |
|   | D2 |    |    | ●  | ○  | ●  |    | 2.368 |
|   | D3 |    | ●  | ●  | ○  | △  |    | 1.520 |
|   | D4 | ●  | ●  | ●  |    | △  |    | 1.000 |
|   | D5 | ●  | ●  |    | ●  | △  |    | 0.834 |
| R |    |    | ○  |    | ○  |    | ●  | 2.613 |

| ● : frictional element is engaged |
| ○ : frictional element is engaged but has no influence on transmitting torque |
| △ : frictional element receives hydraulic pressure but has no influence on output |

METHOD FOR CONTROLLING SHIFT DURING SHIFT OF AUTOMATIC TRANSMISSION

CROSS-REFERENCE TO RELATED APPLICATION

This application claims priority to and the benefit of Korean Patent Application No. 10-2006-0125186 filed in the Korean Intellectual Property Office on Dec. 9, 2006, the entire contents of which are incorporated herein by reference.

BACKGROUND OF THE INVENTION (a) Field of the Invention

The present invention relates to a method for controlling a shift during a shift of an automatic transmission. More particularly, the present invention relates to a method for controlling a shift during a shift of an automatic transmission that controls to complete an N to N-2 shift and an N-2 to N-3 shift simultaneously such that the shift during a shift is smoothly performed when the N-2 to N-3 shift where one frictional element is released is required to be performed during the N to N-2 shift where another frictional element is released and a further frictional element is engaged.

(b) Description of the Related Art

Generally, an automatic transmission provides convenient driving by achieving automatic shifting to a target shift speed as a consequence of the target shift speed being derived from a predetermined shifting pattern based on a vehicle speed and variation of a throttle opening, and then operational elements being controlled according to a hydraulic duty of the target shift speed.

In a case that the shifting to the target shift speed is performed, an automatic transmission has an off-going element that changes from an engaged state to a released state and an on-coming element that changes from a released state to an engaged state. Releasing an off-going element and engaging an on-coming element is realized by controlling a hydraulic pressure supplied to respective elements.

According to a conventional method for controlling a shift during a shift of an automatic transmission, a following shift begins after completing a previous shift. Therefore, a time needed for completion of a shift may be long and shift feel may be deteriorated.

In addition, there exists another method where the following shift is overlapped with the previous shift, wherein the following shift is completed after completion of the previous shift. However, according to the above method, the previous and following shifts are completed at different times and a double shift may be felt accordingly.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for controlling a shift during a shift of an automatic transmission having advantages of performing a smooth shift as a consequence of control pressures for controlling frictional elements of an N to N-2 shift being modified and an N to N-3 shift is performed according to the modified control pressures such that the N to N-2 shift and the N-2 to N-3 shift are simultaneously completed.

A method for controlling a shift during a shift of an automatic transmission according to an exemplary embodiment of the present invention may overlap an N to N-2 shift, where a first frictional element is engaged and a second frictional element is released with an N-2 to N-3 shift where a third frictional element is released.

The method for controlling the shift during a shift of the automatic transmission may include: beginning a predetermined N to N-2 shift when an N to N-2 shift signal is detected; determining whether an N-2 to N-3 shift signal is detected while performing the predetermined N to N-2 shift; modifying the predetermined N to N-2 shift if the N-2 to N-3 shift signal is detected; and overlapping the modified N to N-2 shift with a predetermined N-2 to N-3 shift.

The predetermined N to N-2 shift may include: quickly increasing control pressure of the first frictional element to a pre-charge pressure Ppre; maintaining the control pressure of the first frictional element as the pre-charge pressure; and gradually decreasing control pressure of the second frictional element by a first gradient $\Delta P1$ after a first duration t1 has passed from a time when the N to N-2 shift signal was detected.

The modified N to N-2 shift may include: maintaining the control pressure of the first frictional element as the pre-charge pressure for a second duration t2 from a time when the N-2 to N-3 shift signal was detected; calculating a second gradient $\Delta P2$; gradually decreasing the control pressure of the second frictional element by the second gradient $\Delta P2$; quickly decreasing the control pressure of the first frictional element to a stand-by pressure Pst; and increasing the control pressure of the first frictional element by a third gradient $\Delta P3$.

The second gradient $\Delta P2$ may be calculated by using a control pressure P2 of the second frictional element at the time when the N-2 to N-3 shift signal is detected and a target releasing pressure P3 of the second frictional element.

The control pressure P2 of the second frictional element at the time when the N-2 to N-3 shift signal is detected may be calculated by the equation $P2=P1-\Delta P1*t3$, wherein a third duration t3 is a duration from a time when the control pressure of the second frictional element begins to decrease to a time when the N-2 to N-3 shift signal is detected.

The second gradient $\Delta P2$ may be calculated by the equation $\Delta P2=(P2-P3)/(t4-t3)$, wherein a fourth duration t4 is a duration from a time when the control pressure of the second frictional element begins to decrease to a target releasing time of the second frictional element.

The third duration t3 from a time when the control pressure of the second frictional element begins to decrease to a time when the N-2 to N-3 shift signal is detected may be detected by a timer.

A method for controlling a shift during a shift of an automatic transmission according to another exemplary embodiment of the present invention may overlap an N to N-2 shift where a first frictional element is engaged and a second frictional element is released with an N-2 to N-3 shift where a third frictional element is released, wherein a release of the second frictional element begins after an engagement of the first frictional element begins, and a release of the third frictional element begins after an N-2 to N-3 shift signal is detected, wherein the engagement of the first frictional element and the release of the second and third frictional elements are simultaneously completed.

The release of the second frictional element may begin after a first duration t1 has passed from a time when the engagement of the first frictional element began.

Control pressures of the first and second frictional elements may be modified after a time when the N-2 to N-3 shift signal is detected.

The control pressure of the first frictional element may be modified such that duration of the pre-charge pressure Ppre is extended.

The control pressure of the second frictional element may be modified so as to be decreased to a target releasing pressure P3 until a target releasing time.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figures 1, 2:
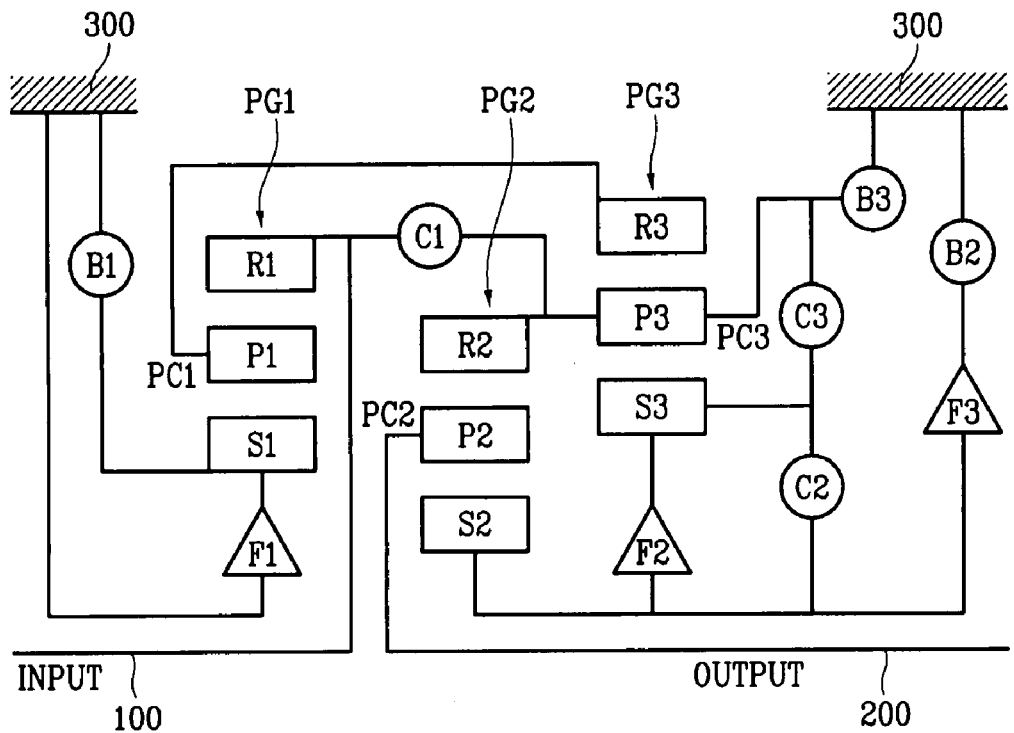
FIG. 1 is a schematic diagram showing a power train of an automatic transmission that is applicable to a method for controlling a shift during a shift according to an exemplary embodiment of the present invention.
FIG. 2 is an operational chart of a power train of an automatic transmission that is applicable to a method for controlling a shift during a shift according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

FIG. 1 is a schematic diagram showing a power train of an automatic transmission that is applicable to a method for controlling a shift during a shift according to an exemplary embodiment of the present invention.

As shown in FIG. 1, a power train of an automatic transmission that is applicable to a method for controlling a shift during a shift according to an exemplary embodiment of the present invention includes first, second, and third planetary gear sets PG1, PG2, and PG3.

The first planetary gear set PG1 is a single pinion planetary gear set, and includes a first sun gear S1, a first planet carrier PC1, and a first ring gear R1 as operational members thereof. A first pinion gear P1, being engaged with the first ring gear R1 and the first sun gear S1, is connected to the first planet carrier PC1.

The second planetary gear set PG2 is a single pinion planetary gear set, and includes a second sun gear S2, a second planet carrier PC2, and a second ring gear R2 as operational members thereof. A second pinion gear P2, being engaged with the second ring gear R2 and the second sun gear S2, is connected to the second planet carrier PC2.

The third planetary gear set PG3 is a single pinion planetary gear set, and includes a third sun gear S3, a third planet carrier PC3, and a third ring gear R3 as operational members thereof. A third pinion gear P3, being engaged with the third ring gear R3 and the third sun gear S3, is connected to the third planet carrier PC3.

In addition, the power train of an automatic transmission includes an input shaft 100 for receiving torque from an engine (not shown), an output shaft 200 for outputting torque from the power train, and a transmission case 300.

According to the power train of an automatic transmission, the first planet carrier PC1 is fixedly connected to the third ring gear R3.

The second ring gear R2 is fixedly connected to the third planet carrier PC3.

The first ring gear R1 always acts as an input member by being fixedly connected to the input shaft 100.

The second planet carrier PC2 always acts as an output member by being fixedly connected to the output shaft 200.

At least one of the fixedly connected second ring gear R2 and the third planet carrier PC3 is variably connected to the input shaft 100 via a first clutch C1.

The second sun gear S2 is variably connected to the third sun gear S3 via a second clutch C2.

The third planet carrier PC3 is variably connected to the third sun gear S3 via a third clutch C3.

The first sun gear S1 is variably connected to the transmission case 300 via a first brake B1 and is subjected to a stopping operation of the first brake B1.

The second sun gear S2 is variably connected to the transmission case 300 via a second brake B2 and is subjected to a stopping operation of the second brake B2.

The third planet carrier PC3 is variably connected to the transmission case 300 via a third brake B3 and is subjected to a stopping operation of the third brake B3.

In addition, a first one-way clutch F1, being disposed between the first sun gear S1 and the transmission case 300, is disposed in parallel with the first brake B1.

A second one-way clutch F2, being disposed between the third sun gear S3 and the second sun gear S2, is disposed in parallel with the second clutch C2.

A third one-way clutch F3, being disposed between the second sun gear S2 and the transmission case 300, is disposed in series with the second brake B2.

FIG. 2 is an operational chart of a power train of an automatic transmission that is applicable to a method for controlling a shift during a shift according to an exemplary embodiment of the present invention.

Here, ● means a frictional element is engaged, ○ means a frictional element is engaged but has no influence on transmitting toque, and □ means a frictional element receives hydraulic pressure but has no influence on output. The above operations are realized by the first, second, and third one-way clutches F1, F2, and F3.

As shown in FIG. 2, the first and second brakes B1 and B2 are operated at a first forward speed D1, the third clutch C3 and the first and second brakes B1 and B2 are operated at a second forward speed D2, the second and third clutches C2 and C3 and the first brake B1 are operated at a third forward speed D3, the first, second, and third clutches C1, C2, and C3 are operated at a fourth forward speed D4, the first and second clutches C1 and C2 and the first brake B1 are operated at a fifth forward speed D5.

In addition, the second clutch C2 and the first and third brakes B1 and B3 are operated at a reverse speed R.

Although hydraulic pressure is applied to the second brake B2 at the third, fourth, and fifth forward speeds D3, D4, and D5, the second and third sun gears S2 and S3 are not subjected to the stopping operation of the second brake B2 by an operation of the third one-way clutch F3.

Hereinafter, up-shifting processes for the power train of an automatic transmission shown in FIG. 1 will be described in detail.

In a shifting process from the first forward speed D1 to the second forward speed D2, the third clutch C3 is operated.

In a shifting process from the second forward speed D2 to the third forward speed D3, the second clutch C2 is operated.

In a shifting process from the third forward speed D3 to the fourth forward speed D4, the first brake B1 is released and the first clutch C1 is operated.

In a shifting process from the fourth forward speed D4 to the fifth forward speed D5, the third clutch C3 is released and the first brake B1 is operated.

Down-shifting processes are reverse processes of the up-shifting processes according to the power train of an automatic transmission shown in FIG. 1.

Hereinafter, skip down-shifting processes for the power train of an automatic transmission shown in FIG. 1 will be described in detail.

In a skip shifting process from the fifth forward speed D5 to the third forward speed D3, the first clutch C1 is released and the third clutch C3 is operated.

In a skip shifting process from the fourth forward speed D4 to the second forward speed D2, the first and second clutches C1 and C2 are released and the first brake B1 is operated.

In a skip shifting process from the third forward speed D3 to the first forward speed D1, the second and third clutches C2 and C3 are released.

Figure 3:
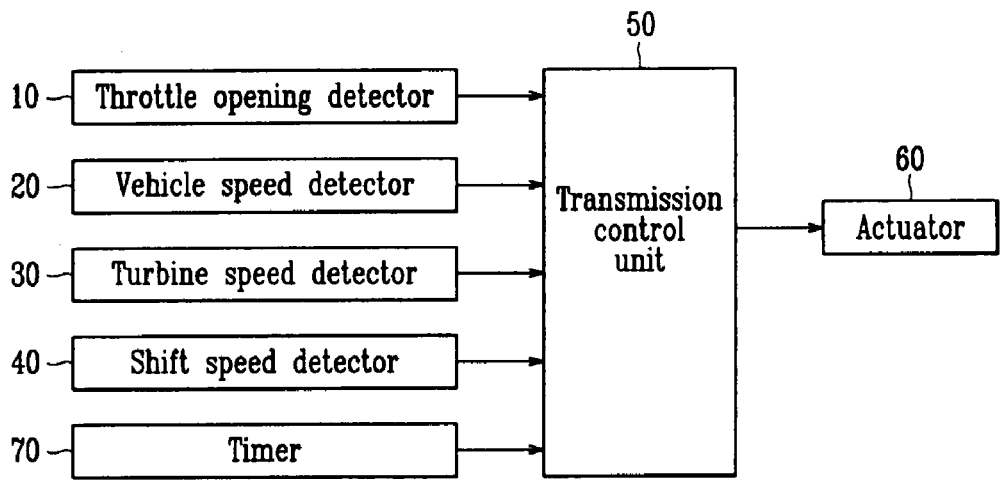
FIG. 3 is a block diagram of a system that performs a method for controlling a shift during a shift of an automatic transmission according to an exemplary embodiment of the present invention.

FIG. 3 is a block diagram of a system that performs a method for controlling a shift during a shift of an automatic transmission according to an exemplary embodiment of the present invention.

As shown in FIG. 3, a system that performs a method for controlling a shift during a shift of an automatic transmission according to an exemplary embodiment of the present invention includes a throttle opening detector 10, a vehicle speed detector 20, a turbine speed detector 30, a shift speed detector 40, a transmission control unit 50, an actuator 60, and a timer 70.

The throttle opening detector 10 detects a throttle opening that is operated in accordance with an accelerator pedal (not shown), and transmits a signal corresponding thereto to the transmission control unit 50.

The vehicle speed detector 20 detects a vehicle speed and transmits a signal corresponding thereto to the transmission control unit 50.

The turbine speed detector 30 detects a turbine speed that is operated as output torque of a torque converter, and transmits a signal corresponding thereto to the transmission control unit 50.

The shift speed detector 40 detects a shift speed and transmits a signal corresponding thereto to the transmission control unit 50.

The transmission control unit 50 can be realized by one or more processors activated by a predetermined program, and the predetermined program can be programmed to perform each step of a method for controlling a shift during a shift of an automatic transmission according to an exemplary embodiment of the present invention.

The transmission control unit 50 receives driving information from the throttle opening detector 10, the vehicle speed detector 20, the turbine speed detector 30, and the shift speed detector 40, and generates a control signal for controlling release and engagement of respective frictional elements of an automatic transmission based on the driving information.

The driving information includes the throttle opening, the vehicle speed, the turbine speed, and the shift speed.

The actuator 60 receives the control signal from the transmission control unit 50 and controls the release and the engagement of the respective frictional elements of an automatic transmission. The actuator 60 includes at least one of solenoid valve for controlling hydraulic pressure in an automatic transmission.

The timer 70 is connected to the transmission control unit 50. When the transmission control unit 50 transmits a shift signal to the timer 70, the timer 70 detects a shift processing time and transmits a signal corresponding thereto to the transmission control unit 50.

Hereinafter, referring to the drawings, a method for controlling a shift during a shift of an automatic transmission according to an exemplary embodiment of the present invention will be described in detail.

Figure 4:
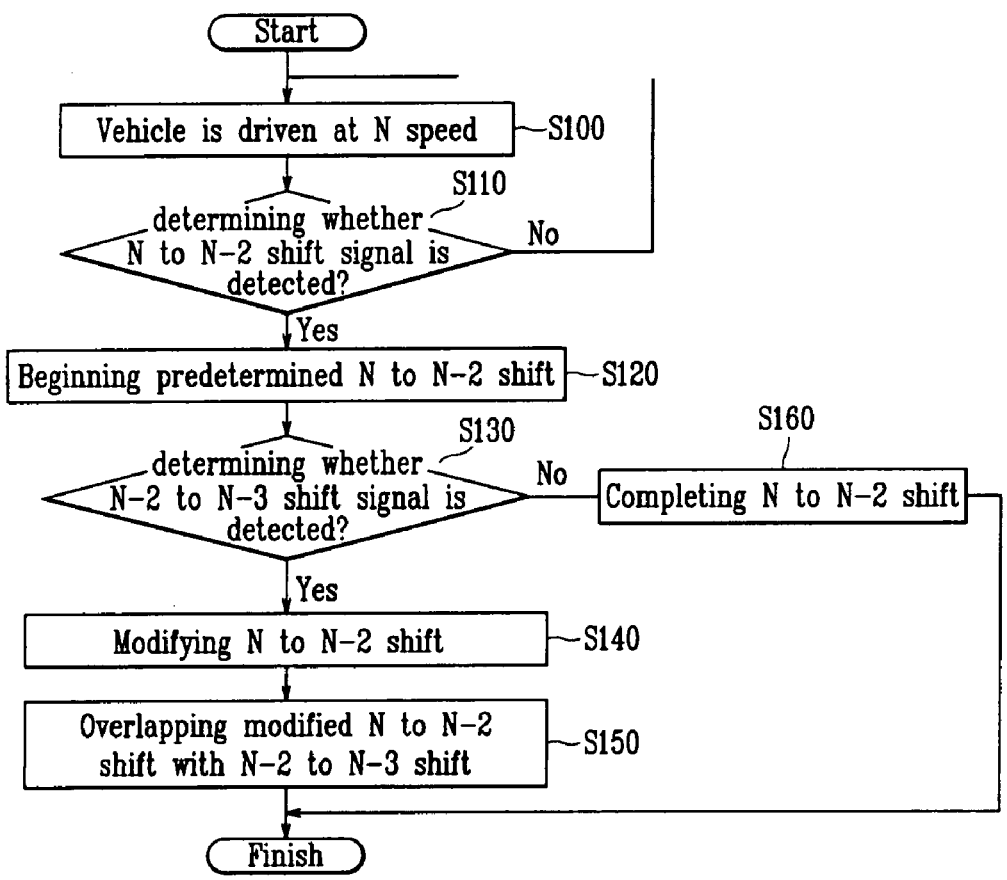
FIG. 4 is a flowchart showing a method for controlling a shift during a shift of an automatic transmission according to an exemplary embodiment of the present invention.
Figure 5:
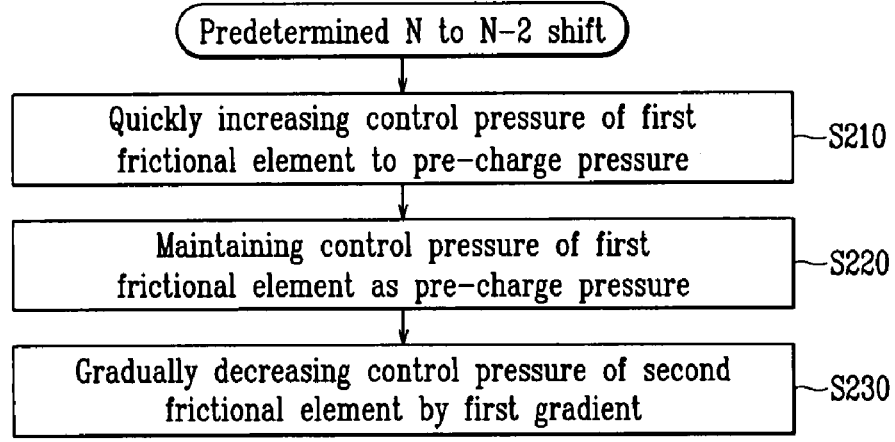
FIG. 5 is a flowchart showing steps of a predetermined N to N-2 shift according to an exemplary embodiment of the present invention.
Figure 6:
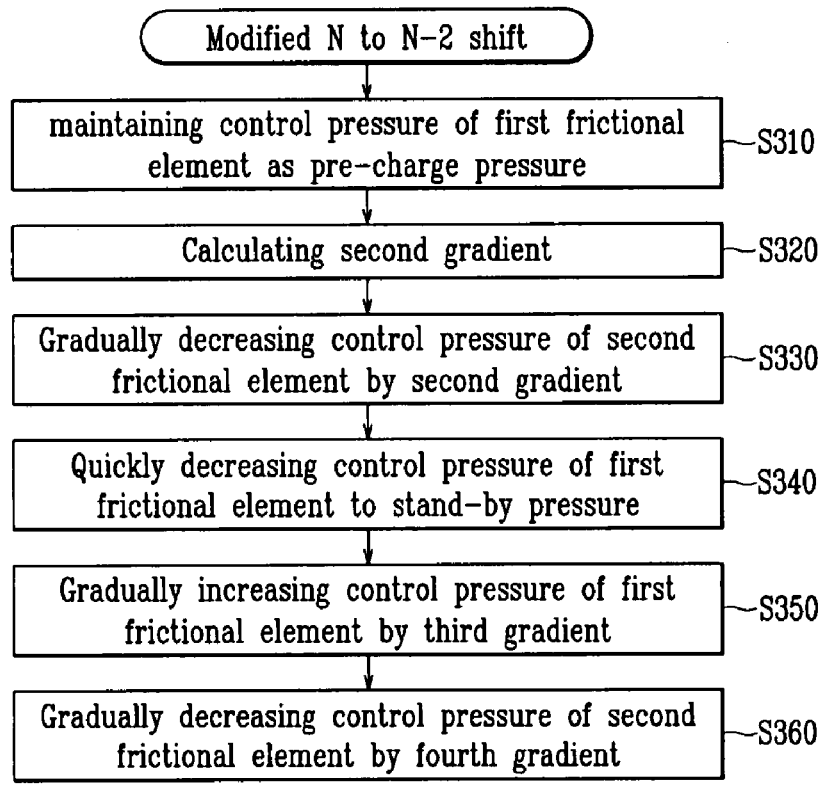
FIG. 6 is a flowchart showing steps of a modified N to N-2 shift according to an exemplary embodiment of the present invention.

FIG. 4 is a flowchart showing a method for controlling a shift during a shift of an automatic transmission according to an exemplary embodiment of the present invention.

Figure 8:
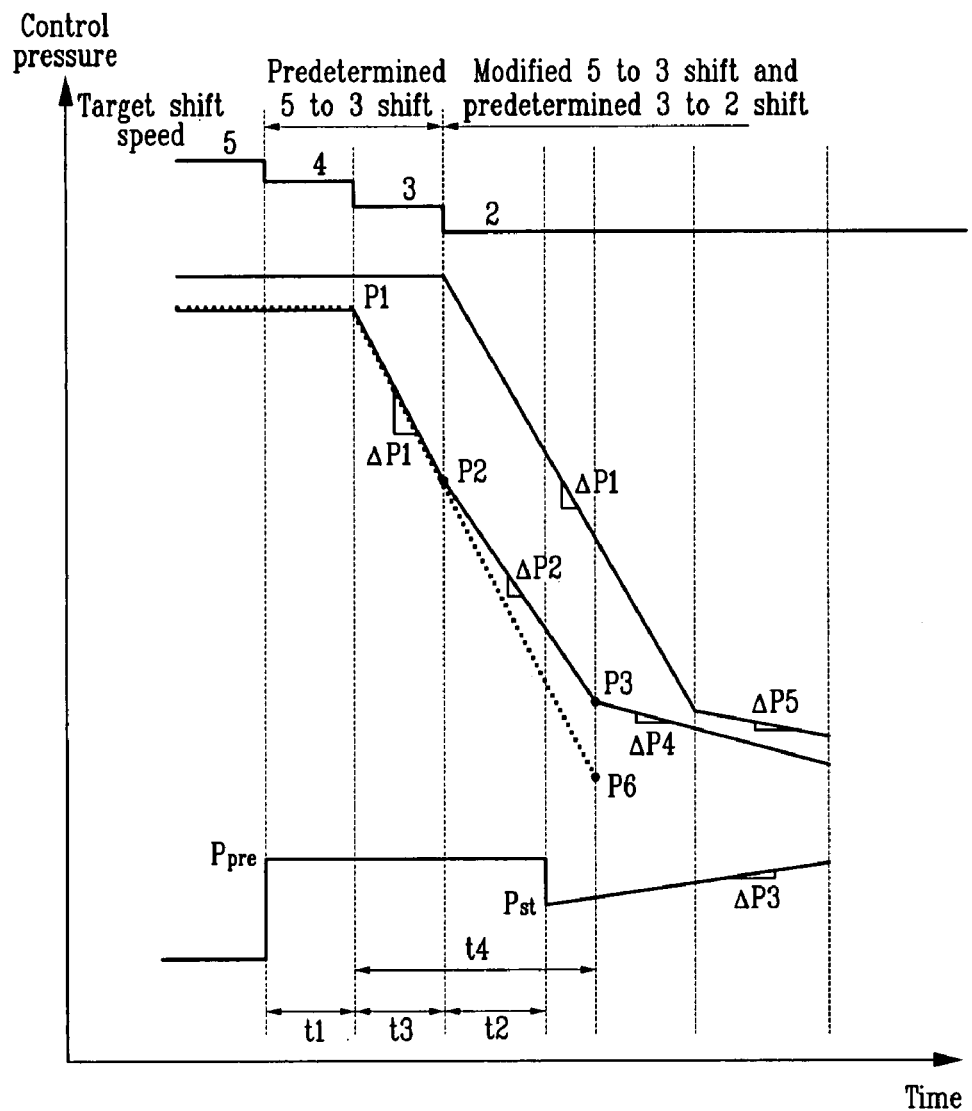
FIG. 8 is a control diagram showing hydraulic pressures of frictional elements for a method for controlling a shift during a shift of an automatic transmission according to an exemplary embodiment of the present invention.

As shown in FIG. 8, according to an exemplary embodiment of the present invention, an N to N-2 shift where a first frictional element is engaged and a second frictional element is released is overlapped with an N-2 to N-3 shift where a third frictional element is released.

In a state that a vehicle is driven at an N speed at a step S100, the transmission control unit 50 determines whether an N to N-2 shift signal is detected at a step S110 as shown in FIG. 4. If the transmission control unit 50 does not detect the N to N-2 shift signal, the vehicle continues to be driven at the N speed at the step S100. If the transmission control unit 50 detects the N to N-2 shift signal, the transmission control unit 50 drives the actuator 60 to begin a predetermined N to N-2 shift at a step S120. Simultaneously, the transmission control unit 50 drives the timer 70 to detect a processing time of the N to N-2 shift. The N to N-2 shift signal is generated when the throttle opening according to the vehicle speed is equal to or larger than a predetermined value.

After that, the transmission control unit 50 determines whether an N-2 to N-3 shift signal is detected at a step S130. If the transmission control unit 50 does not detect the N-2 to N-3 shift signal, the predetermined N to N-2 shift is completed at a step S160.

If the transmission control unit 50 detects the N-2 to N-3 shift signal, the transmission control unit 50 modifies the predetermined N to N-2 shift at a step S140.

After that, the transmission control unit 50 drives the actuator 60 to perform the modified N to N-2 shift and a predetermined N-2 to N-3 shift simultaneously at a step S150.

Figure 9:
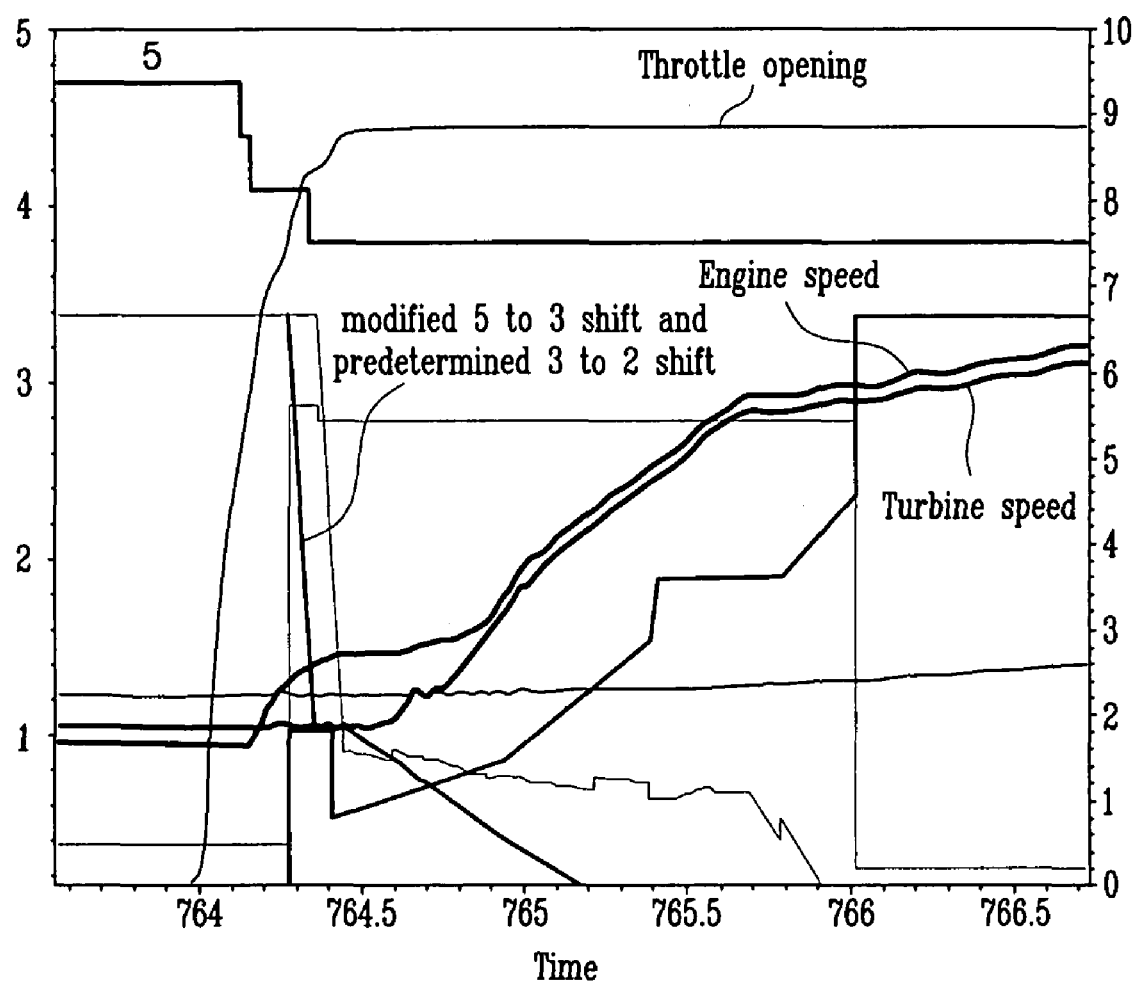
FIG. 9 is a graph showing a throttle opening, an engine speed, and a turbine speed of a vehicle that applies a method for controlling a shift during a shift of an automatic transmission according to an exemplary embodiment of the present invention.

Hereinafter, referring to FIG. 5 to FIG. 9, an N to N-3 shift will be described in detail. For better comprehension and ease of description, a 3 to 2 shift during a 5 to 3 shift is illustrated in FIGS. 8 and 9, but the present invention is not limited to this illustrative embodiment and can be used for a 4 to 3 shift during a 6 to 4 shift and a 2 to 1 shift during a 4 to 2 shift.

The predetermined N to N-2 shift begins when the transmission control unit 50 detects the N to N-2 shift signal. In this case, the transmission control unit 50 quickly increases control pressure of the first frictional element to a pre-charge pressure Ppre at a step S210, and maintains the control pressure of the first frictional element as the pre-charge pressure Ppre at a step S220.

In addition, after the first duration t1 has passed from a time when the control pressure of the first frictional element was controlled to be begun, a control pressure of the second frictional element is decreased by a first gradient $\Delta P1$ at a step S230. For facilitating hydraulic control, the control pressure of the second frictional element is controlled after the first duration t1 has passed from beginning of hydraulic control of the first frictional element. The first duration t1 and the first gradient $\Delta P1$ are predetermined values according to the kind of transmission, and can be easily obtained by a person of ordinary skill in the art.

After that, when the transmission control unit 50 detects the N-2 to N-3 shift signal, the predetermined N to N-2 shift is modified. The predetermined N to N-2 is modified such that the N to N-2 shift and the N-2 to N-3 shift are completed simultaneously. Simultaneous completion of the N to N-2 shift and the N-2 to N-3 shift may enhance shift feel.

When the N-2 to N-3 shift signal is detected, the transmission control unit 50 drives the actuator 60 to maintain the control pressure of the first frictional element as the pre-charge pressure Ppre for a second duration t2 at a step S310. Simultaneously, the transmission control unit 50 calculates a second gradient $\Delta P2$ at a step S320.

The second gradient $\Delta P2$ is required for decreasing the control pressure of the second frictional element to a target releasing pressure P3, and is calculated as follows.

First, a control pressure P2 of the second frictional element at the time when the N-2 to N-3 shift signal is detected is calculated by Equation 1.

$$P2 = P1 - \Delta P1 * t3 \quad \text{[Equation 1]}$$

Here, P1 is an engaging pressure of the second frictional element, and t3 is a duration from a time when the control pressure of the second frictional element begins to decrease to a time when the N-2 to N-3 shift signal is detected.

After that, the second gradient $\Delta P2$ is calculated by Equation 2.

$$\Delta P2 = (P2 - P3)/(t4 - t3) \quad \text{[Equation 2]}$$

Here, P3 is the target releasing pressure of the second frictional element, and t4 is a duration from a time when the control pressure of the second frictional element begins to decrease to a target releasing time of the second frictional element. The target releasing time is a time when the target releasing pressure P3 of the second frictional element occurs. The P3 and t4 are predetermined values according to the kind of transmission, and can be easily obtained by a person of ordinary skill in the art.

After that, the transmission control unit 50 decreases the control pressure of the second frictional element by the second gradient $\Delta P2$ at a step S330. In addition, at a step S340, the transmission control unit 50 quickly decreases the control pressure of the first frictional element to a stand-by pressure Pst after a second duration t2 has passed from when the N-2 to N-3 shift signal was detected, and the transmission control unit 50 gradually increases the control pressure of the first frictional element by a third gradient $\Delta P3$ at a step S350. Above-mentioned engaging processes are generally used for engaging frictional elements, and thus the detailed description will be omitted.

In addition, the transmission control unit 50 gradually decreases the control pressure of the second frictional element by a fourth gradient $\Delta P4$ at a step S360.

In addition, according to an exemplary embodiment of the present invention, the N to N-2 shift and the N-2 to N-3 shift are controlled to be completed simultaneously for smooth shift feel. Therefore, the modified N to N-2 shift and the predetermined N-2 to N-3 shift are performed simultaneously.

Figure 7:
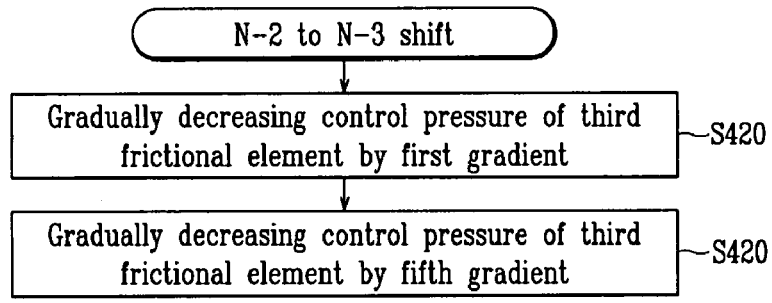
FIG. 7 is a flowchart showing steps of a predetermined N-2 to N-3 shift according to an exemplary embodiment of the present invention.

As shown in FIGS. 7 and 8, when the N-2 to N-3 shift signal is detected, the transmission control unit 50 gradually decreases a control pressure of the third frictional element by the first gradient $\Delta P1$ for a predetermined time. The predetermined time may be 100 ms.

After that, the transmission control unit 50 gradually decreases the control pressure of the third frictional element by a fifth gradient $\Delta P5$. The predetermined N-2 to N-3 shift may be performed by any preferred method of a person of ordinary skill in the art.

FIG. 9 is a graph showing a throttle opening, an engine speed, and a turbine speed of a vehicle that applies a method for controlling a shift during a shift of an automatic transmission according to an exemplary embodiment of the present invention.

As shown in FIG. 9, the engine speed and the turbine speed change smoothly in a case of a shift during a shift according to an exemplary embodiment of the present invention as a consequence of the modified N to N-2 shift overlapping with the predetermined N-2 to N-3 shift. Therefore, shift shock may be reduced.

According to the present invention, in a case that an N-2 to N-3 shift is needed while performing an N to N-2 shift, the N to N-2 shift is modified such that the N to N-2 shift and the N-2 to N-3 shift are completed simultaneously. Therefore, the shift may be smoothly performed and shift feel may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling a shift during a shift of an automatic transmission, wherein an N to N-2 shift where a first frictional element is engaged and a second frictional element is released and an N-2 to N-3 shift where a third frictional element is released are overlapped with each other, the method comprising:
- beginning a predetermined N to N-2 shift when an N to N-2 shift signal is detected;
- determining whether an N-2 to N-3 shift signal is detected while performing the predetermined N to N-2 shift;
- modifying the predetermined N to N-2 shift if the N-2 to N-3 shift signal is detected; and
- overlapping the modified N to N-2 shift with a predetermined N-2 to N-3 shift.

2. The method of claim 1, wherein the predetermined N to N-2 shift comprises:
- quickly increasing control pressure of the first frictional element to a pre-charge pressure Ppre;
- maintaining the control pressure of the first frictional element as the pre-charge pressure; and
- gradually decreasing control pressure of the second frictional element by a first gradient $\Delta P1$ after a first duration $t1$ has passed from a time when the N to N-2 shift signal was detected.

3. The method of claim 1, wherein the modified N to N-2 shift comprises:
- maintaining the control pressure of the first frictional element as the pre-charge pressure Ppre for a second duration $t2$ from a time when the N-2 to N-3 shift signal was detected;
- calculating a second gradient $\Delta P2$;
- gradually decreasing the control pressure of the second frictional element by the second gradient $\Delta P2$;
- quickly decreasing the control pressure of the first frictional element to a stand-by pressure Pst; and
- increasing the control pressure of the first frictional element by a third gradient $\Delta P3$.

4. The method of claim 3, wherein the second gradient $\Delta P2$ is calculated by using a control pressure P2 of the second frictional element at the time when the N-2 to N-3 shift signal is detected and a target releasing pressure P3 of the second frictional element.

5. The method of claim 4, wherein the control pressure P2 of the second frictional element is calculated by an equation $P2=P1-\Delta P1*t3$, wherein a third duration $t3$ is a duration from a time when the control pressure of the second frictional element begins to decrease to a time when the N-2 to N-3 shift signal is detected.

6. The method of claim 4, wherein the second gradient $\Delta P2$ is calculated by an equation $\Delta P2=(P2-P3)/(t4-t3)$,
wherein a fourth duration $t4$ is a duration from the time when the control pressure of the second frictional element begins to decrease to a target releasing time of the second frictional element.

7. The method of claim 5, wherein the third duration $t3$ is detected by a timer.

8. A method for controlling a shift during a shift of an automatic transmission, wherein an N to N-2 shift where a first frictional element is engaged and a second frictional element is released and an N-2 to N-3 shift where a third frictional element is released are overlapped with each other,
- wherein a release of the second frictional element begins after an engagement of the first frictional element begins, and
- a release of the third frictional element begins after an N-2 to N-3 shift signal is received, and
- wherein an engagement of the first frictional element and the release of the second and third frictional elements are simultaneously completed.

9. The method of claim 8, wherein the release of the second frictional element begins after a first duration $t1$ has passed from a time when the engagement of the first frictional element began.

10. The method of claim 9, wherein control pressures of the first and second frictional elements are modified after a time when the N-2 to N-3 shift signal is detected.

11. The method of claim 10, wherein the control pressure of the first frictional element is modified such that a duration of the pre-charge pressure Ppre is extended.

12. The method of claim 10, wherein the control pressure of the second frictional element is modified so as to be decreased to a target releasing pressure P3 for a duration from a time when the control pressure of the second frictional element begins to decrease to a target releasing time of the second frictional element.

* * * * *